United States Patent [19]
Latimer, Jr. et al.

[11] Patent Number: 6,054,059
[45] Date of Patent: Apr. 25, 2000

[54] USE OF A CERAMIC METAL OXIDE FILTER WHOSE SELECTION DEPENDS UPON THE PH OF THE FEED LIQUID AND SUBSEQUENT BACKWASH USING A LIQUID HAVING A DIFFERENT PH

[75] Inventors: Glen E. Latimer, Jr., Leavittsburg; Harold L. Fatheringham, Jr., Chardon, both of Ohio; Paul K. T. Liu, Pittsburgh, Pa.

[73] Assignee: Kinetico Incorporated, Ohio

[21] Appl. No.: 08/807,139

[22] Filed: Feb. 27, 1997

[51] Int. Cl.[7] .......................... B01D 37/00; B01D 65/02; B01D 69/02
[52] U.S. Cl. ...................... 210/767; 210/772; 210/791; 210/797; 210/798; 210/500.25; 210/321.69
[58] Field of Search .................................. 210/409, 410, 210/411, 500.25, 510.1, 767, 772, 791, 792, 793, 794, 797, 798, 321.69

[56] References Cited

U.S. PATENT DOCUMENTS

| | | |
|---|---|---|
| 4,632,876 | 12/1986 | Laird et al. . |
| 4,680,230 | 7/1987 | Gibb et al. . |
| 4,725,390 | 2/1988 | Laird et al. . |
| 4,865,734 | 9/1989 | Schulz . |
| 4,869,960 | 9/1989 | Gibb et al. . |
| 4,923,714 | 5/1990 | Gibb et al. . |
| 4,944,905 | 7/1990 | Gibb et al. . |
| 4,963,257 | 10/1990 | Schulz . |
| 5,032,294 | 7/1991 | Schulz . |
| 5,137,607 | 8/1992 | Anderson et al. . |
| 5,288,399 | 2/1994 | Schulz . |
| 5,308,454 | 5/1994 | Anderson . |

OTHER PUBLICATIONS

Reed, J.S., Introduction to the Principles of Ceramics Processing, text from chapter 10 entitled "Deflocculants and Coagulants", pp. 132–149, (copyright 1988).

Schulz et al., "Evaluating Buoyant Coarse Media Flocculation", pp. 51–63, (1994).

Product literature of Gundle Lining Systems Inc., four pages, copyright 1991.

Schulz, C.R., and Okun, D.A., "Surface Water Treatment for Communities in Developing Countries", pp. 104–125 and 203–213, date unknown.

Primary Examiner—Robert J. Popovics
Attorney, Agent, or Firm—Watts, Hoffman, Fisher & Heinke, Co. L.P.A.

[57] ABSTRACT

A filter for removing particles from a feed liquid. The filter includes a filtration material having a metal oxide composition selected to provide the material with an affinity for the particles of the feed liquid. The affinity of the material is dependent upon a pH of the feed liquid.

13 Claims, 4 Drawing Sheets

USE OF A CERAMIC METAL OXIDE FILTER WHOSE SELECTION DEPENDS UPON THE PH OF THE FEED LIQUID AND SUBSEQUENT BACKWASH USING A LIQUID HAVING A DIFFERENT PH

FIELD OF THE INVENTION

The present invention relates to a filter and, in particular, to a filter having an affinity for fine particles of a liquid.

BACKGROUND OF THE INVENTION

One important application of filters is for filtration of drinking water. Source water typically has a pH of about 6 to 7, which varies depending upon environmental and other factors. Particles in the source water can be positively or negatively charged with various magnitudes of charge. Particles present in most naturally occurring source water are generally negatively charged.

Current regulations by the Environmental Protection Agency require source water to have a certain turbidity or clarity before it is suitable for drinking. These regulations also require the removal or deactivation of viruses and protozoan cysts from the water. Examples of cysts that must be treated are giardia and cryptosporidium. When ingested by humans these cysts can cause serious illness or death. Cryptosporidium cysts range from about 3 to about 5 microns in size and giardia cysts range from about 7 to about 12 microns in size, which makes them difficult to remove efficiently and economically with current filtration systems.

Conventional filters remove cysts and other particles of a small size using chemical coagulants. The chemical coagulants increase the size of the particles to a point at which they can be removed. During coagulation, small particles are agglomerated into larger particles by adding the chemical coagulants to the feed solution. Once agglomerates of a desired size are produced, the solution may be passed through a filter to filter out the agglomerates. Examples of water filtration media are sand, garnet and anthracite.

Chemical coagulation has several disadvantages. The mechanism for filtering the water is by physically straining particles from the feed solution which are larger than can pass through interstices between grains of the media. The media can only remove particles that are larger than the interstices. For example, sand filters can only remove particles greater than about 20 microns in size. Eventually, the particles held by the media seal off the interstices, reducing filtration efficiency.

Chemical coagulation is disadvantageous in that filtration occurs primarily at the surface of the bed, rather than throughout the bulk of the media, which limits the capacity of the filter. Chemical coagulation is also disadvantageous in view of the cost of the chemicals, the need to regulate the amount of chemicals despite a continuously changing feed stream and in view of a low flow rate. Disposing of chemical sludge waste is another concern.

SUMMARY OF THE INVENTION

It is desirable to remove negatively charged fine particles from a water solution intended for drinking. By removing substantially all particles about 5 $\mu$m in size and less from the water, cysts are also removed, avoiding a health hazard. The filtration material of the invention is designed to remove fine particles by selecting the composition of the filtration material, based upon the pH of the feed liquid, to provide the filtration material with an affinity for the particles to be removed. The filter then attracts the fine particles from the solution.

In general, the present invention is directed to a filtration system comprising an apparatus for directing along a flow path a feed liquid containing particles to be removed. Ceramic filtration material is disposed in the flow path. The filtration material has a composition comprising metal oxides selected to provide the material with an affinity for the particles of the feed liquid. The affinity is dependant upon a pH of the feed liquid.

Another embodiment of the present invention is directed to a filter for removing particles from a feed liquid. The filter comprises the ceramic filtration material comprising the metal oxide composition selected to provide the material with an affinity for the particles of the feed liquid, the affinity being dependent upon a pH of the feed liquid.

In particular, the filtration material can attract particles about 5 microns and less in size. The metal oxide composition, preferably comprising at least one metal oxide selected from the group consisting of oxides of silicon, aluminum and magnesium, is selected to provide the filtration material with an electrical charge of an opposite sign (preferably +) with respect to the sign of an electrical charge of the particles to be removed (preferably −). To this end, the filtration material has no connection to an external power source. The filtration material removes substantially all negatively charged particles about 5 microns and less in size contained in any feed liquid, for example, source water for drinking. The filtration material of the present invention may also be used to filter particles from other feed liquids, including oil and municipal waste water, and may be used for chemical purification for reusing acidic and caustic solutions.

Moreover, the apparatus preferably directs feed liquid free from pH-adjusting chemicals and from chemical coagulants. Although the filtration material is preferably used as a pressure filtration system, it may also be used as a gravity filtration system. The filtration material has a particle size not greater than 20 mesh, more preferably about 70 mesh and less. The filtration material may be buoyant or not. The buoyant filtration material would have a specific gravity greater than 1.

A preferred embodiment of the present invention preferably includes an apparatus for directing a backwashing liquid into contact with the filtration material to repulse particles that have been attracted to the filtration material. The filtration material preferably has a net negative electrical charge in contact with the backwashing liquid. The backwashing liquid preferably includes filtered feed liquid and a compound that can change the pH of the filtered feed liquid.

Another preferred embodiment of the present invention is directed to a filtration system comprising the apparatus for directing along a flow path a feed liquid containing particles to be removed. The ceramic filtration material is disposed in the flow path and has a particle size not greater than 20 mesh and a composition comprising metal oxides. The composition is selected to provide the filtration material with an electrical charge of an opposite sign than an electrical charge of particles about 5 microns in size and less to be removed. The affinity is dependent upon a pH of the feed liquid.

The present invention is directed to an efficient, economical, and reliable way of removing fine particles from a feed liquid. The invention advantageously does not require the use of chemical coagulants with their attendant drawbacks. In addition, the invention need not rely upon the physical straining mechanism for filtration. Instead, the invention relates to a novel electrical affinity the filtration material has for the particles to be removed, determined by the selected metal oxide composition of the filtration material, the pH of the feed liquid and the sign and magnitude of the feed liquid particles. This affinity provides the material with a large filtration capacity around the entire surface of the particles throughout the bulk of the media.

The ceramic feed material of the present invention is durable and chemically inert. Upon being saturated with the feed liquid particles, the filtration material can easily be backwashed. The specific gravity of the filtration material enables it to expand, or move apart, greatly during backwashing, resulting in effective scrubbing of the filtration particles and efficient regeneration of the filter. The filter may be used and regenerated for extended periods of time due to its ceramic composition. In preferred form, by adjusting the pH of the backwashing liquid, the charge of the filtration material can be changed to repulse the attracted particles in a manner of minutes. Therefore, the backwashing feature of the present invention results in very effective and efficient regeneration of the filter.

A method of filtering particles from a liquid according to the present invention generally comprises the steps of selecting a metal oxide composition for a ceramic filtration material to provide the material with an affinity for particles in a feed liquid. The filtration material contacts the feed liquid. The affinity the filtration material has for the particles is changed by contact with the feed liquid. The feed liquid is directed into the filtration material whereby the particles are attracted from the feed liquid to the filtration material.

In particular, pressurized air is directed into the filtration material prior to directing the backwashing liquid into the filtration material. The feed liquid may be directed into the filtration material under pressure or via gravity flow. The construction of a gravity flow apparatus is well within the skill of an engineer in the water filtration industry. Feed liquid free from chemical coagulants and pH-adjusting chemicals is preferably used. The affinity is an electrical charge formed on the filtration material without subjecting the filtration material to an external power source. Substantially all particles about 5 microns and less in size are removed from the feed liquid.

A preferred aspect of the method of the present invention includes directing the backwashing liquid into the filtration material. The backwashing liquid has a different pH than the feed liquid. The affinity of the filtration material is changed by contacting the filtration material with the backwashing liquid to repulse the particles from the filtration material. The backwashing liquid is preferably directed into the filtration material in an opposite direction than the feed liquid is directed into the filtration material (i.e., in counter current fashion).

Other embodiments of the invention are contemplated to provide particular features and structural variants of the basic elements. The specific embodiments referred to as well as possible variations and the various features and advantages of the invention will become better understood when considered in connection with the accompanying drawings and the detailed description that follows.

DETAILED DESCRIPTION OF PREFERRED EMBODIMENTS

Figure 1:
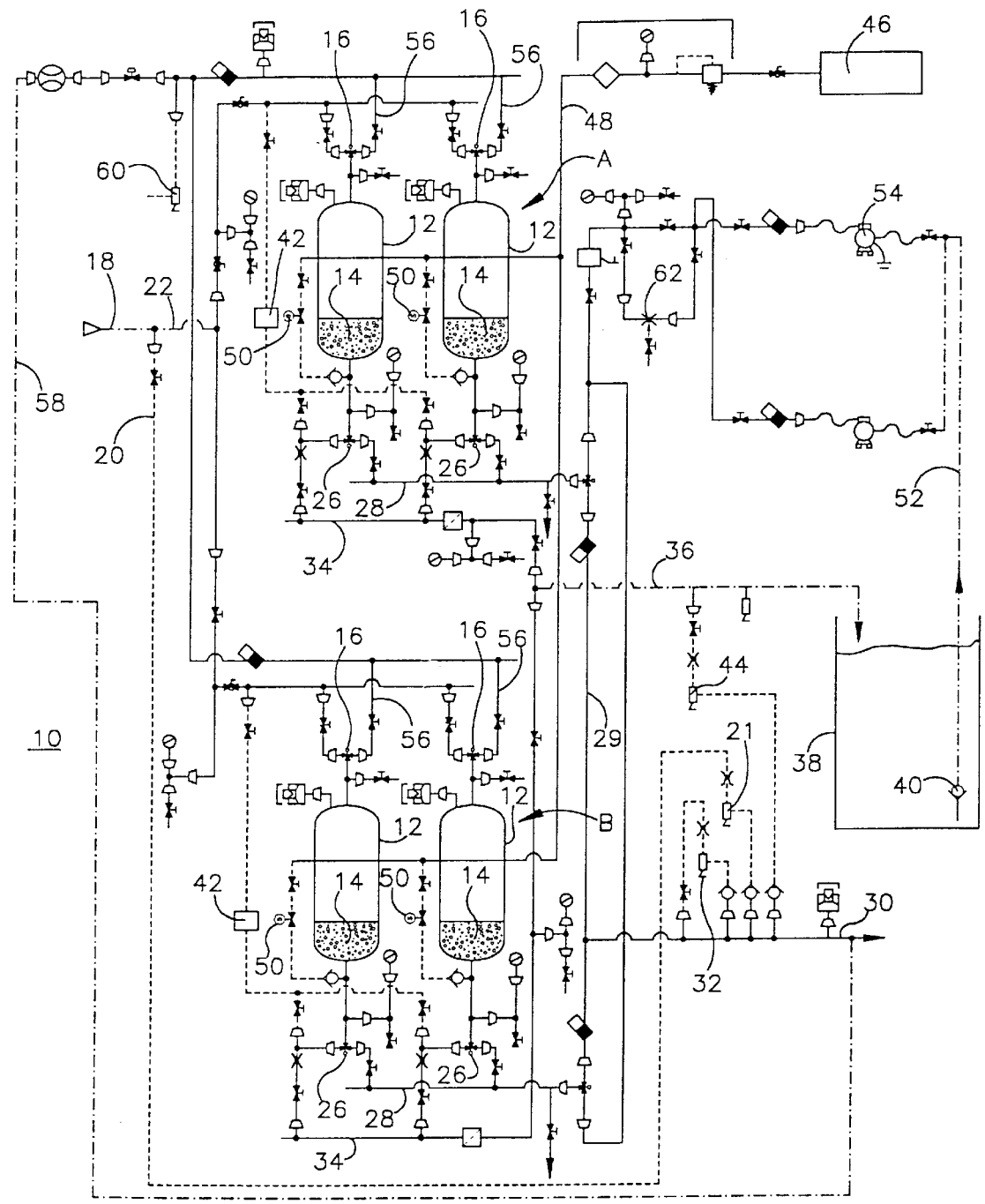
FIG. 1 is a schematic view of a filtration system constructed in accordance with the present invention.

The present invention is directed to a pressure filtration system 10 shown in FIG. 1 employing tanks 12 having a filtration material 14 that can remove fine particles, preferably less than about 5 µm and less, from a feed liquid without the need for chemical coagulants or pH-adjusting chemicals being added to the feed liquid for filtration. The filter removes particles that are smaller than can be removed by conventional straining filtration techniques. Removing fine particles from the feed solution ensures that substantially all protozoan cysts are also removed.

A metal oxide composition of the filtration material is selected to provide the material with an electrical affinity for the particles to be removed from the feed liquid. The strength of the affinity of the material depends upon the pH of the feed liquid and the composition that is selected. By adjusting the composition of the filtration material the filter can be used efficiently in solutions of various pH. The filtration material can easily be backwashed by flushing it with a liquid having a particular pH that is selected, based upon the composition of the filtration material, to cause the material to repulse the attracted particles.

FILTRATION

The filtration media composition comprises at least one metal oxide. At least a portion of the outer surface of the granules is comprised of at least one of the metal oxides. One preferred surface metal oxide is silicon dioxide ($SiO_2$). Other surface metal oxides are preferably aluminum oxide ($Al_2O_3$), magnesium oxide (MgO), or a combination thereof. Compositions with these surface metal oxides are referred to herein as MgO-containing and $Al_2O_3$-containing filtration material. The combined electrical characteristics of the metal oxides provide the granules of the filtration material with a particular net charge when the filtration material is immersed in a liquid.

The sign (+ or −) and magnitude of the electrical charge on the granules (as may be determined by the mobility of the particles to be removed) is dependent upon the pH of the solution in which the filtration material is immersed. Each of the preferred surface metal oxides, SiO, MgO and $Al_2O_3$, and combinations thereof, provides the filtration material with different characteristics from the others when immersed in the same solution.

Any metal oxides may be used in the present invention to produce a filter that can remove particles of a given electrical charge in a solution of a predetermined pH. However, it is preferable to combine surface metal oxides, such as $SiO_2$/MgO and $SiO_2$/$Al_2O_3$, to benefit from the combined electrical affinity characteristics of each metal oxide. Examples of other metal oxides that may be used in the present invention, along with their zero point charges, are as follows: titanium dioxide (ZPC of about 11), rutile (ZPC of about 6.5), iron oxide (ZPC of about 6.7), chromium oxide (ZPC of about 7) and calcium oxide (ZPC of about 10.5). Those skilled in the art will appreciate that other metal oxides may also be suitable for use in the present invention in view of this disclosure.

Zero point charge (ZPC) is defined herein as the pH at which the mobility of a particle (meter/second/volt/meter) is zero under the influence of an electric field. $SiO_2$ has a ZPC when immersed in an aqueous solution having a pH ranging from about 2 to about 3. As filtration media with a $SiO_2$ surface metal oxide is immersed in an aqueous solution having a pH between 2 and 3, there is no net charge on the media. As the pH of the solution is lowered below a pH of 2, the net charge on the granules becomes negative and increases in magnitude with a decrease in pH. When the pH of the solution is raised above a pH of 3, the net surface charge becomes positive, and increases in magnitude with an increase in pH.

An $Al_2O_3$ surface metal oxide has a ZPC when immersed in an aqueous solution having a pH ranging from about 8.5 to about 9. As filtration material with this surface metal oxide is immersed in an aqueous solution having a pH of between 8.5 and 9, there is no net charge on the media. As the pH of the solution is raised to a pH above about 9, the net charge becomes negative and increases in magnitude with an increase in pH. As the pH of the solution is lowered to a pH below about 8.5, the net charge becomes positive and increases in magnitude with a decrease in pH.

An MgO surface metal oxide has a ZPC when immersed in an aqueous solution having a pH of about 11. As filtration media comprised of this surface metal oxide is immersed in an aqueous solution with a pH of about 11, there is no net charge on the granules. As the pH of the solution is increased to above a pH of about 11, the net charge on the granules becomes negative and increases in magnitude with an increase in pH. As the pH of the solution is lowered below a pH of about 11, the net charge becomes positive and increases in magnitude with a decrease in pH.

Figure 2:
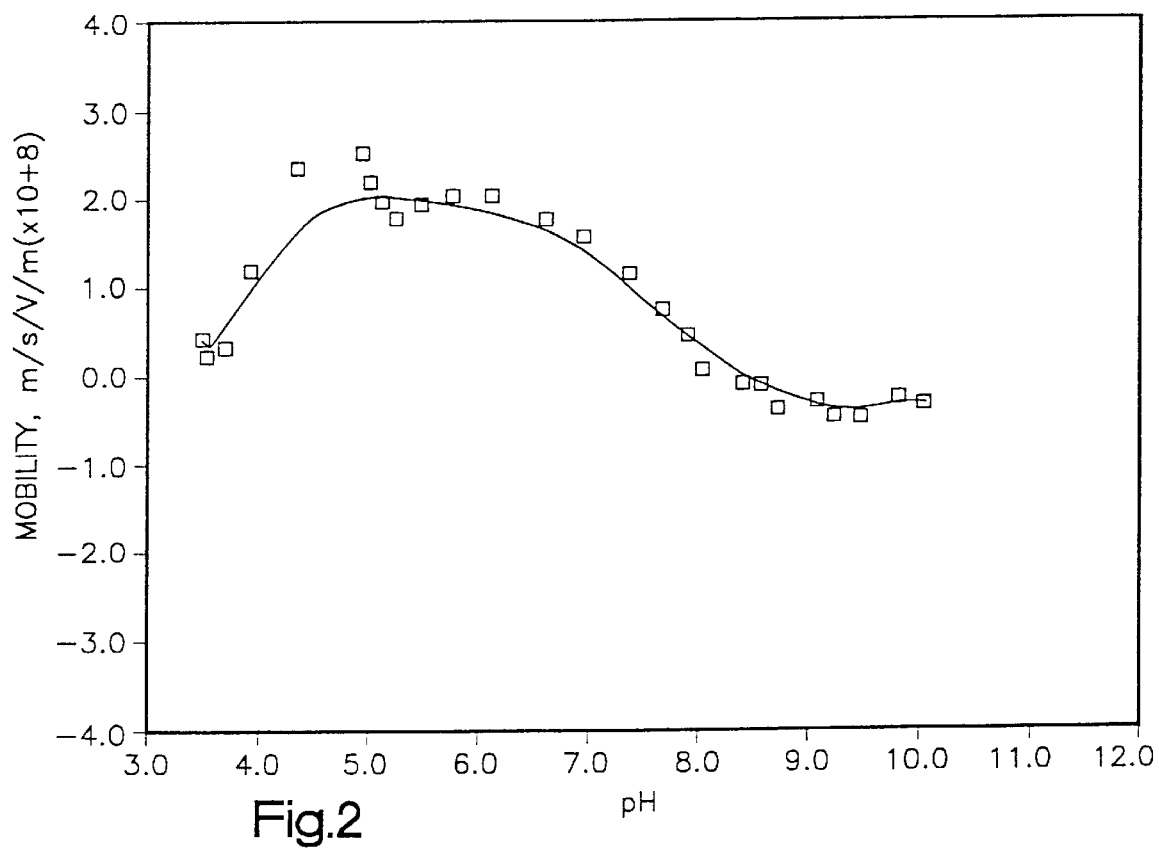
FIG. 2 is a graph showing mobility as a function of pH for an aluminum oxide-containing filtration material of the present invention.

In the present invention, the combined ZPC characteristics of the surface metal oxides provide the granules with a net surface charge of the desired sign and magnitude. A granule comprised of $SiO_2$ and $Al_2O_3$ exhibits a net positive charge when immersed in a solution of a pH, for example, in the range of from about 2.3 to about 8.2 as shown in FIG. 2. That is, the material has a ZPC at a pH of about 2.3 and a ZPC at a pH of about 8.2. The mobility curve shown in FIG. 2 was generated using an apparatus including a water bath and a scale. A given charge was placed on a positive pole at one end of the bath and a given charge was placed on a negative pole at the other end of the bath. The filtration material was first located at point zero, i.e., at equal distances between the positive and negative poles. Upon applying an electrical field, the speed and direction that the material traveled was monitored and plotted in FIG. 2.

Negatively charged particles in an aqueous solution having a pH ranging from about 2.3 to about 8.2 will be attracted by the positively charged $SiO_2$—$Al_2O_3$ filtration material. When the filtration material is immersed in solutions having a pH below about 2.3 or above about 8.2, the net charge on the filtration material is negative. Therefore, the $SiO_2$—$Al_2O_3$ filtration material will not attract the negatively charged particles in these ranges. The highest efficiency of removing negatively charged particles using $SiO_2$—$Al_2O_3$ filtration material may occur when the filtration material is immersed in a solution having a pH, for example, of about 3.0 to about 5.5, more specifically, at a pH of about 3.0 to about 4.5 or about 4.5 to about 5.5 (FIG. 2). In these ranges of pH the $Al_2O_3$-containing filtration material of the exemplary composition specified herein has the greatest magnitude of net positive charge. This greatest degree of the affinity may vary with the amount and type of surface metal oxides in the filtration material composition.

The present invention, through the selection of the type and amount of surface metal oxides in the filtration material, enables the filtration material to be tailored to efficiently remove fine particles from solutions having various pH. To measure the mobility of particles with respect to MgO-containing filtration material, samples were added to deionized water at 10.7 and 17.7 percent by weight solids content. The samples were dispersed with a probe type cell disrupter and measured immediately afterwards. The zeta potential results for the MgO filtration material were measured using a standard ESA-8000 system which employed a Potentiometric Titration Module of the ESA operating software from Mastec Applied Sciences. The results of the test were given in terms of an electrokinetic sonic amplitude ("ESA") signal. The ESA is the amplitude of the pressure wave generated by particle motion divided by the applied electric field strength in units of mPa/m/V. The ESA signal is directly proportional to electrophoretic mobility of the particles and the zeta potential and may be converted directly to an absolute zeta potential. A radius of 30 microns was estimated as a particle size in the calculation of ESA.

For a discussion of the principles of zeta potential, isolectric point and zero point charge of ceramic materials used in flocculation and deflocculation, see James S. Reed, *Introduction to the Principles of Ceramic Processing, Wiley-Interscience*, New York, 1988, pp. 132–149, which is incorporated herein by reference in its entirety.

Granules comprised of $SiO_2$ and MgO had an ESA signal with an apparent isoelectric point at a pH in the range of about 8.8 to about 9.4. Isoelectric point is the pH at which the zeta potential is zero. Providing the strongest net positive charge in solution having a pH ranging from about 6 to about 7 may be attainable according to the present invention upon producing a MgO filtration material with a ZPC approaching 11. The $SiO_2$—MgO filtration material is highly efficient at removing negatively charged particles from surface water, which has a pH in the range of from about 6 to about 7.

The overall range at which the filter granules are positively (or negatively) charged in a solution of a given pH, as well as the greatest magnitude of the charge, can be adjusted as desired by empirically selecting the amount and the type of metal oxides used in the filtration media. For example, the upper limit of the range of pH in which the material has a positive charge is increased by replacing $Al_2O_3$ with MgO, because the zero point charge of MgO (ZPC of 11) is greater than that of $Al_2O_3$ (ZPC of 8.5–9.0).

BACKWASHING

Another important feature of the present invention is the ability to regenerate the filter by a backwashing process. As filtration progresses, interstices in the filtration material become filled. The point at which backwashing is initiated may be predetermined based upon various factors including a differential pressure above a certain level (i.e., the difference in raw feed liquid pressure upstream of the filtration tank 12 and the filtered feed liquid pressure downstream of the filtration tank), total gallons of feed solution filtered, a predetermined filtration duration and filtered water in excess of a given turbidity.

The conditions that trigger backwashing may vary due to factors including the size of the tank and the season of the year. For example, an average filtration duration before backwashing for the tanks 12 shown in FIG. 1 is 12–16 hours at a rate of 10 gallons/minute/square foot. However, during summer, algae and other substances are prevalent, requiring more frequent backwashing. Conversely, filtration may be conducted for 2–3 days during winter before backwashing, since the water supply is not churned as much at this time of year. Regardless of the time of year, it is preferable to backwash after no longer than 48 hours of filtration per tank.

When backwashing is desired, particles are preferably removed by using a solution having a pH that is different than the feed solution. This may be achieved by introducing a new acidic or basic backwashing liquid or, preferably, by introducing a solution formed by adding an acid or base to the filtered feed solution. When the filtration material is contacted by the backwashing liquid the surface charge of the filtration material is preferably changed to have an electrical charge of a sign (i.e., −) that is opposite to the sign it had during filtration (i.e., +).

The pH that is selected for the backwashing liquid depends upon the zero point charges of the filtration material as well as on the strength of the charge of the particles to be removed. In the case of filtering surface water with $SiO_2$—$MgO$ filtration material, the backwashing liquid preferably has a pH above about 11.0 or below about 2.3. To regenerate the $SiO_2$—$Al_2O_3$ filtration material, a backwashing liquid with a pH of above about 8.2 or below about 2.3 is preferably used. Solutions of any pH may be employed during backwashing and filtration, except for a pH of about 1 and about 14. Backwashing solutions at these pH may degrade the media. The backwashing solution pH is preferably at or above the higher ZPC of the filtration material.

The bed of filtration material is rinsed with the backwashing liquid, preferably in counter-current fashion. That is, the backwashing liquid is directed into the filtration material in the opposite direction than the direction in which the raw feed solution was directed into the material. When the backwashing liquid contacts the filtration material, the net charge of the filtration material is changed from positive to negative. As a result, the filtration material repulses the negatively charged particles that were attracted to it during filtration. Upon completion of the backwashing operation, the bed of filtration material can be reused to attract the particles from the feed liquid. By immersing the filtration material in the feed liquid once again, the sign of the net electrical charge on the filtration media will again become positive.

It is preferable during backwashing to have about 100% media bed expansion. This provides a sufficient scrubbing action to remove filtered particles from the tanks. There is an upper limit of media bed expansion during backwashing. Backwashing must occur at a high enough rate to remove the particles being filtered, but not so high that the media will be blown into the lines above the tank. With the ability to adjust the specific gravity of the filtration material an optimum backwashing rate may be selected for the application. A typical backwashing rate is about 8 to about 10 gallons per minute per square foot of area.

PROCESSING OF FILTRATION MEDIA

The process for making the filtration material generally includes the following steps. The raw materials are proportioned batchwise in a mixing apparatus. One example of filtration material suitable for use in the present invention comprises the following composition (in % by weight): 96% mineral fines, which may be obtained from Minnesota Mining and Manufacturing Company; 3% bentonite clay, which may be obtained from the American Colloid Company; 1% silicon carbide, which may be obtained from Minnesota Mining and Manufacturing Company; and 14% water.

The dry raw materials are mixed with the water and agglomerated into "prills" having a desired size, with time and percentage of water being variable. The term "prill" as used herein means green or unfired particles of filtration material. The wet prills are dried in a rotating cylindrical gas heated drier. The particles are not completely dried, but are dried enough to be able to be screened and stored.

In a screening process, "on-size" material of desired size is separated from "off-size" material. The off-size material is recycled into the prilling process and the "on-size" material is stored in bulk bags. The on-size prills are proportionally mixed with the surface metal oxide, for example, aluminum oxide, and fed into a kiln.

The particle size of the raw materials can be adjusted as desired. All mesh sizes herein are taken from U.S. Standard Sieves. To produce a filtration material having a size of 70 mesh, about 80% of the raw material must be at this particle size. Finer particles, for example, 80 mesh, can comprise the remaining 15–20% of the raw materials. However, less than 5% of larger particles, for example, 60 mesh, are present in the raw materials.

In the firing stage, the on-size prills are heated in a kiln at a temperature ranging from about 2000 to 2200° F. A kiln that is 4 feet in diameter, 40 feet in length and set at an adjustable incline may be used. The kiln is preferably direct fired with gas as the fuel. The prills are introduced at the higher end of the kiln and as the kiln is rotated, they slowly travel to the lower end of the kiln. A gas burner is located in the center of the lower end of the kiln, which allows a flame to travel along the elongated horizontal axis of the kiln to produce the required temperature. An indirect fired kiln having gas jets disposed outside of the rotating cylinder may also be suitable for making the filtration material of the present invention.

Temperature and rotation are the variables during firing that are used to adjust the specific gravity of the material, as well as to produce different sizes of filtration material. The silicon carbide is involved in a reaction during firing that produces trapped gas within the particles. As a result of this reaction, the specific gravity of the particles may be adjusted as desired. For example, if a lower specific gravity is desired, the material is present in the kiln for a longer time and higher temperature, which generates more trapped gases. If a higher specific gravity is desired, the material spends less time in the kiln at a lower temperature. This enables a wide range of particle sizes of the filtration material to be produced.

Adjusting the specific gravity of the particles is useful for backwashing, since backwashing rates are dependent upon the specific gravity of the media being backwashed: the lighter the media, the lower the backwashing rate needed to achieve the same media bed expansion, the heavier the media the higher the backwashing rate. The range of specific gravity of the filtration material that may be useful in the present invention is from about 0.3 to about 2.6, and is usually greater than 1.

In addition to providing the filtration material with a desired electrical affinity, the surface metal oxides serve as parting agents that prevent the prills from sticking together as the intense heat is applied during firing. The surface metal oxides are located on the surface of each particle. However, the surfaces of the particles may not be composed entirely of the surface metal oxides. During firing, some of the surface may be occupied by the surface metal oxides and other portions of the surface may be occupied by the mineral fines. If magnesium oxide is used, a higher percentage of magnesium oxide on the surface may be required compared to the amount of aluminum oxide on the surface. The magnesium oxide may be added to the raw materials before the material is prilled.

The amount of parting agent to use is determined empirically, since in the current direct fired kiln process the precise amount of parting agent that is deposited on the surfaces of the filtration particles is difficult to determine. Most of the parting agent is blown from the kiln due to a large velocity of air generated by the gas burner. Amounts of parting agents that may be suitable for use in the present invention are disclosed in U.S. Pat. Nos. 4,725,390 and 4,632,876, which are incorporated by reference herein in their entireties. Reference to these patents may be made for the specific raw materials and formulations that may be suitable for use in the present invention. However, the final particle size of the filtration material of the present invention is smaller than disclosed in these patents.

After leaving the kiln the fired material is cooled in a large rotating cylinder mounted on an incline. The outside surface of the cylinder is cooled with water while the hot material travels through it.

Upon arriving at the end of the cooling cylinder the material is screened to desired sizes, separated and stored. A chemical analysis of one $Al_2O_3$-containing filtration material (using an $Al_2O_3$ parting agent) having a density of 2.23 g/cc (using an air pycnometer), the amounts being in percent by weight, is as follows:

Silicon Dioxide ($SiO_2$) . . . 60.4%
Aluminum Oxide ($Al_2O_3$) . . . 20.4%
Iron Oxide ($Fe_2O_3$) . . . 3.2%
Calcium Oxide (CaO) . . . 1.7%
Magnesium Oxide (MgO) . . . 0.6%
Sodium Oxide ($Na_2O$) . . . 6.7%
Potassium Oxide ($K_2O$) . . . 6.5%
Loss on Ignition (LOI) . . . 0.5%

It is believed that the chemical analysis of a suitable MgO-containing filtration material (using MgO as the parting agent) would be substantially the same as above, except that MgO would replace $Al_2O_3$ in an equivalent amount by volume. A screening analysis of the $Al_2O_3$-containing material (using U.S. Standard Sieves) was as follows:

| +60 Mesh | +70 Mesh | +80 Mesh | Pan |
|---|---|---|---|
| 0.30% | 86.50% | 13.00% | 0.20% |

Portions of an exemplary process suitable for making the filtration material of the present invention are disclosed in the U.S. Pat. Nos. 4,632,876 and 4,725,390. All amounts of materials hereafter are given in % by weight unless otherwise indicated. In the first step of the process, binder, silicon carbide, mineral particulates, optionally $Al_2O_3$ (e.g. 3 to 15 parts by weight), and water are mixed and spheroidized in order to form unfired spheroids. One example of suitable mineral particulates contains: 60% orthoclase, 10% nepheline, 10% hornblende, 5% diopside, 15% accessory minerals (titanite, apatite, magnetite and biotite) and trace amounts of secondary minerals (e.g. kaolinite and analcite). Another example contains approximately 75% plagioclase and orthoclase feldspar and 25% of the minerals pyroxene, hornblende, magnetite and quartz of which magnetite is less than 5%. Byproduct mineral fines of perlite (containing 2–5% chemically bound water) will also function as the mineral particulates. Minerals containing chemically bound water or sulfur which are useful components of the mineral particulates are: hornblende, apatite, biotite, pyrite, vermiculite and perlite.

Typical binders that may be useful as raw materials in the invention are bentonite (preferably sodium bentonite), starch, polyvinyl alcohol, cellulose gum, polyvinyl acetate and sodium lignosulphonate.

Silicon carbide raw material may conveniently be obtained as coproduct fines (less than 8 micrometers particle size) from the manufacture of silicon carbide abrasive products. It may alternatively be formed in situ, such as by adding a polycarbosilane solution to the mineral mixture which would convert into SiC during processing.

Several types of mixing equipment may be used such as balling pans or disk spheroidizing machines. Machines known as high energy mixers are well suited to this application. Two examples of such machines are the Littleford mixer and the machine known as the Eirich machine. The Eirich machine is described in U.S. Pat. No. 3,690,622.

There are four basic steps in making the unfired spheroids in a high energy mixer: (1) mixing the dry powders at high speed rotation of the pan and an impacting impeller of the machine; (2) nucleation at which time water is added to the region of the mixer near the impacting impeller to be dispersed into droplets; (3) growth of the spheroids in the manner of a snow ball with the powder agglomerating during which time the impacting impeller rotates at a slower speed than it did during the nucleation step; and (4) polishing or smoothing the surfaces of the spheroids by turning of the impacting impeller and allowing the pan to rotate, similar to a balling pan. Polishing is optional.

The amount of binder may generally comprise about 1–5% by weight of the dry materials fed to the mixer and is generally sufficient to permit screening and handling of the spheroids without significant attrition or breakage.

The wet spheroids are discharged from the mixer and dried at a temperature of about 40° C. to 200° C. The dried spheroids are then typically screened. The particle size range selected is actually smaller than the desired end product because of the growth of the spheroids during firing.

The dried spheroids are next mixed with the parting agent, for example, alumina. The dry spheroids and parting agent may be in a tumbling mixer such as a twin shell mixer or a cement mixer. The amount of parting agent usually ranges from 3 to 50 weight percent of the material fed to the kiln. Magnesium oxide, zircon, diaspore and high alumina clays may also be useful parting agents as discussed above, as well as other surface metal oxides.

The following are examples of specific metal oxides that may be used as parting agents in the present invention: alumina (less than 45 micrometers particle size obtained as A-2 alumina from Alcoa), magnesium oxide obtained as M-51 MgO from Fisher Scientific Company, and zicron (less than 45 micrometers particle size obtained from NL Industries). Aluminum and magnesium salts which convert to oxides at elevated temperatures (e.g., $Al(OH)_3$ and $MgCO_3$) may be substituted for $Al_2O_3$ and MgO in mole equivalent amounts. Although the description of an exemplary method addresses the use of alumina parting agent, the other parting agents could be used in proportions, by volume, and in particle sizes similar to the alumina. The particle size distribution of the parting agent depends on the desired end product.

The next step is to feed, typically by means of a vibratory feeder, the mixture of parting agent and dry spheroids to a rotary kiln. Firing may be done statically, but a rotary kiln is the preferred apparatus for this step. The residence time of the spheroids in a rotary kiln is dependent upon several parameters: kiln length, diameter, angle, and rotational speed, feed rate to the kiln, temperature within the kiln, gas atmosphere, and diameter of the spheroids. Residence time and temperature are adjusted to achieve the desired properties with each specific formulation for a given end use. With a typical residence time in a rotary kiln of 20 minutes or more, increasing the kiln temperature results in decreasing fired density of the spheroids. Firing temperature is typically above 1100° C.

The ceramic spheroids are overtired, which allows for the formation of the internal air cells, making the finished product less dense. The firing atmosphere is air. The silicon carbide in the spheroids is oxidized during firing, the SiC near the surface being more extensively oxidized than that in the core.

Some of the metal oxide parting agent (e.g., alumina or magnesia) becomes part of the spheroids during the firing step. Metal oxide (e.g. $Al_2O_3$ or MgO) or a metal oxide precursor (e.g. $MgCO_3$ or $Al(OH)_3$)) which converts to the metal oxide during firing, is incorporated into the spheroids as they pass through the kiln. Higher firing temperatures result in a thicker shell of parting agent on the spheroids. The coarser the particle size of the mineral particulate in the composition, the higher the required temperature, and more metal oxide is absorbed into the spheroids during firing to form an outer shell rich in metal oxide concentration. Also, finer particle size distribution of the parting agent allows more metal oxide to be absorbed into the spheroids.

According to the present invention, the product from the kiln is screened. The filtration material of the present invention has a final particle size, for example, of 20/40 and 30/50, which means that all particles have a size ranging from 20 to 40 mesh (841–420 $\mu$m in diameter) and 30 to 50 mesh (595–297 $\mu$m in diameter), respectively. The particle size fraction is not larger than about 20 mesh and, preferably, is about 70 mesh (about 210 $\mu$m in diameter). The particle size is selected, depending upon the composition of filtration material, to provide the material with electrical affinity characteristics that are suitable for removing particles about 5 $\mu$m and less in diameter to comply with the regulations requiring a turbidity less than 0.5 ntu. In many cases, the particle size of the filtration material is much smaller than 20 mesh, for example, about 70 mesh. Filtration particles of a size of not greater than 20 mesh and preferably about 70 mesh, are important in the present invention, since they are able to remove particles about 5 $\mu$m and less from the feed liquid through a combination of physical straining and electrical affinity mechanisms. These small filtration particles pack more closely together than larger particles and have a greater surface area, which increases the electrical affinity effect.

Either before, during or after the screening step, the fired spheroids may be subjected to vigorous agitation by air or some other agitation means or to a water washing step in order to remove dust from their surfaces. Specific gravity is determined according to ASTM Standard D-2840-69.

BEST MODE FOR CARRYING OUT THE INVENTION

FIG. 1 is a schematic of a pressure filtration system constructed according to the present invention shown generally at 10. Two trains A and B of four steel tanks 12 are preferably used in this system, although any number of trains and tanks in each train can be used. In this embodiment, each tank is 24 inches in diameter and 72 inches in height. The tank size may vary, for example, from 6 inches in diameter and 13 inches in height to 60 inches in diameter and 96 inches in height. The interior of each tank of this particular system is capable of filtering normally at a rate of 30 gallons per minute. Each tank includes a deflector at its top (not shown) for deflecting feed liquid entering the top of the tanks to prevent indentations in the media.

Each tank contains filtration material 14 prepared in accordance with the present invention. In the 24 inch diameter tanks shown, the media 14 is at least about 24 inches deep.

The entire system is controlled by a programmable logic controller ("PLC") (not shown) in a central control panel which controls all functions and monitors system performance through various sensors, in a manner that would be apparent to one skilled in the art. The sensors include turbidimeters, flow meters and pressure sensors. A lighted display on the control panel indicates the position of all motorized ball valves.

Motorized three-way ball valves 16 are disposed at the top of each tank. A main influent feed liquid line 18 branches into lines 20 and 22. The line 20 leads to a turbidimeter 21 that tests the turbidity of the source water. The line 22 splits to each train and extends to the three way valves 16 at the top of each of the tanks.

The system will be discussed by referring to only train A as being online, although either train may be placed online first. During an initial rinse-up period of the first train A the water travels through the feed line 22, through the tanks 12 of train A and then through motorized three way ball valves 26 at the bottom of the tanks. From these valves the water leaves through effluent lines 28 to a line 29 and then to a line 30. Some rinse water passes through a turbidimeter 32 which tests it for clarity. The rinse water travels along the line 30 to a waste facility including infiltration basins (not shown). Once the turbidimeter 32 indicates the rinse water in the first tank of train A is acceptable, that tank is put online for water filtration. The next tank in train A then undergoes a rinse-up process and, if the turbidity is favorable, is also placed online for filtration.

When the tanks of train A are placed online for filtration the tanks of train B are usually placed on standby or are undergoing backwashing. During filtration, raw influent water is pumped through the lines 18 and 22, to the motorized valves 16 at the top of the tanks of train A. Water flows into the tanks at a pressure, for example, of at least about 35 pounds per square inch or higher for the particular tanks shown. The feed liquid may be inlet into the tanks at a pressure ranging, for example, from about 35 psi to about 150 psi at a rate of 10 gallons/minute/square foot of area. The filtration material 14 removes fine particles from the water according to the present invention. The filtered feed liquid is diverted by the motorized valve 26 at the bottom of the tank to an effluent line 34, through a line 36 to a water storage tank 38. The filtration system commences filtration when signalled to do so by an indication from a level indicator 40 in the storage tank 38 that the filtered water level in the storage tank is undesirably low. The online tanks will continue to filter the water until the storage tank 38 is full or the backwashing operation is signalled.

The PLC receives a signal initiating backwashing of train A that may be generated by various sensors. For example, the signal may be an indication of a high differential pressure in the tanks. Each train includes a combination pressure gauge and switch 42 for determining the differential pressure in the tanks. That is, pressure of the raw feed liquid upstream of the tanks is compared to pressure of the filtered feed liquid downstream of the tanks. Normal differential pressure of the particular tanks shown may be, for example, about 10 psi. A signal that the differential pressure of the tanks shown is about 22 to 25 psi, for example, may trigger backwashing. Another signal that may trigger backwashing is when the turbidity of the filtered water approaches about 0.5 ntu as determined by a turbidimeter 44. Backwashing may also be triggered after a set duration or after a particular quantity of feed liquid has been treated. Any or all of the foregoing indicators may be used to initiate backwashing.

In addition to taking online tanks off-line to conduct backwashing, the PLC may also initiate backwashing of off-line tanks. For example, a tank that has been inactive for about 48 hours may be backwashed to avoid the formation of bacteria in the tank. If both trains require backwashing, whichever receives the signal first will be backwashed, while the other stays online. If the online train reaches a second set point, such as a turbidity of 0.45 ntu, the system would be shut down until the tanks again satisfy acceptable filtration standards.

When backwashing of train A is signalled, the PLC operates the motorized ball valves 26 to bring the tanks of train B online for filtration. The tanks of train A are drained to remove about a foot of water to accommodate movement of the media during backwashing. The PLC then signals an air compressor 46 to generate pressurized air, which is regulated and filtered. An air line 48 leads to the tanks of each train. The pressurized air travels from the compressor along the air line 48 to the bottom of the tanks of train A. The PLC signals for the lower motorized valves 26 to close to prevent liquid from leaving the tanks, and signals the upper motorized valves 26 to move to a waste position for venting the air from the tanks. Solenoid valves 50 are then activated and pressurized air enters the tanks for about 2 minutes. The pressurized air dislodges particles from the media through a scrubbing action during about 100% media bed expansion. The valves 50 are then closed and the filtration material in the tanks are allowed to settle for about 1 minute.

A backwashing line 52 carrying filtered feed liquid extends from the storage tank 38 to a centrifugal pump 54. If there is sufficient pressure from the storage tanks, the pump may be omitted. The backwashing line 52 extends to the lines 28 to the open motorized three-way ball valves 26 below each of the tanks. Backwashing water is pumped upwardly counter-current wise into the tanks of train A at a rate, for example, of about 8–10 gallons/minute/square foot for about 15 minutes to about 45 minutes for the particular tanks shown. After flowing through the tanks, the backwashing water travels through a line 56 to a waste line 58 leading to the waste disposal facility. Some of the backwashing water that has passed through the tanks is tested for clarity by a turbidimeter 60. The backwashed tanks of train A are put on standby until they are needed again for filtration.

A compound for adjusting the pH of the filtration material during backwashing is preferably introduced into the backwashing liquid stream using an eductor or venturi 62. Those skilled in the art will appreciate that the compound for adjusting the pH of the backwashing liquid can be used at other locations of the filtration system. In the present invention raising the pH during backwashing is preferable. For raising the pH, a basic solution, for example, a solution of NaOH, is preferably used. In some applications, it may be desirable to lower the pH of the backwashing liquid, in which case an acidic solution, for example, a solution of HCl, may be used.

Other devices including valves, reducers, strainers, pressure gauges and vacuum breakers may be employed in the present filtration system as shown in FIG. 1. The function and operation of these devices would be apparent to those skilled in the art in view of this disclosure.

EXPERIMENTAL RESULTS

In an experiment for evaluating the performance of the filtration material, three columns were loaded with 70 mesh filtration material. One column contained 100 milliliters (ml) of drum roasted $MgO$—$SiO_2$ filtration material, another column contained 100 ml of batch kiln $MgO$—$SiO_2$ filtration material and the last column contained 100 ml of $Al_2O_3$—$SiO_2$ filtration material. The columns were each subjected to 6 exhaustion and backwash cycles. An aqueous feed liquid in 15 gallon batches and having a pH of about 6–7 was pumped through the columns in parallel at 206 milliliters/minute. Samples were collected in 10 bed volume composites and analyzed for turbidity, pressure and particle analysis. The endpoint for each cycle was 120 bed volume processed (volume of water in the bed of filtration media) or 15 pounds/inch$^2$ gauge pressure, whichever came first.

The results of particle removal across the broad range of 1–10 $\mu m$ in particle size is shown in Table I below. The results of the removal of fine particles across the range of 0.5 to 5.0 $\mu m$ in particle size is shown in Table II below. The results of a turbidity analysis is shown in Table III below.

TABLE I

Filtration Material Column Study
Average Overall Log Removals

| Size: $\mu m$ | Example A Drum Roasted $MgO$—$SiO_2$ | Example B Batch Kiln $MgO$—$SiO_2$ | Example C 70 Mesh $Al_2O_3$—$SiO_2$ |
|---|---|---|---|
| 1.00 | 1.88 | 2.00 | 1.18 |
| 2.00 | 2.11 | 2.13 | 1.42 |
| 3.00 | 2.10 | 2.11 | 1.46 |
| 4.00 | 2.12 | 2.11 | 1.54 |
| 5.00 | 2.4 | 2.16 | 1.69 |
| 6.00 | 2.5 | 2.22 | 1.96 |
| 8.00 | 2.72 | 2.13 | 2.31 |
| 10.00 | 2.29 | 2.15 | 2.28 |

TABLE II

Filtration Material Column Study
Average Overall Log Removals

| Size: $\mu m$ | Example A Drum Roasted $MgO$—$SiO_2$ | Example B Batch Kiln $MgO$—$SiO_2$ | Example C 70 Mesh $Al_2O_3$—$SiO_2$ |
|---|---|---|---|
| .50 | 1.81 | 1.84 | 1.36 |
| 1.00 | 2.71 | 2.85 | 1.98 |
| 1.50 | 2.85 | 2.88 | 1.91 |
| 2.00 | 2.73 | 2.78 | 1.86 |
| 2.50 | 2.67 | 2.74 | 1.84 |
| 3.00 | 2.64 | 2.70 | 1.81 |
| 3.50 | 2.61 | 2.66 | 1.80 |
| 4.00 | 2.44 | 2.48 | 1.82 |

TABLE III

Magnesium Oxide Filtration Material Column Study
Average Overall effluent ntu

| Example A<br>Drum Roasted<br>MgO—SiO$_2$ | Example B<br>Batch Kiln<br>MgO—SiO$_2$ | Example C<br>70 Mesh<br>Al$_2$O$_3$—SiO$_2$ |
|---|---|---|
| .016 | 0.20 | 0.52 |

Figure 3:
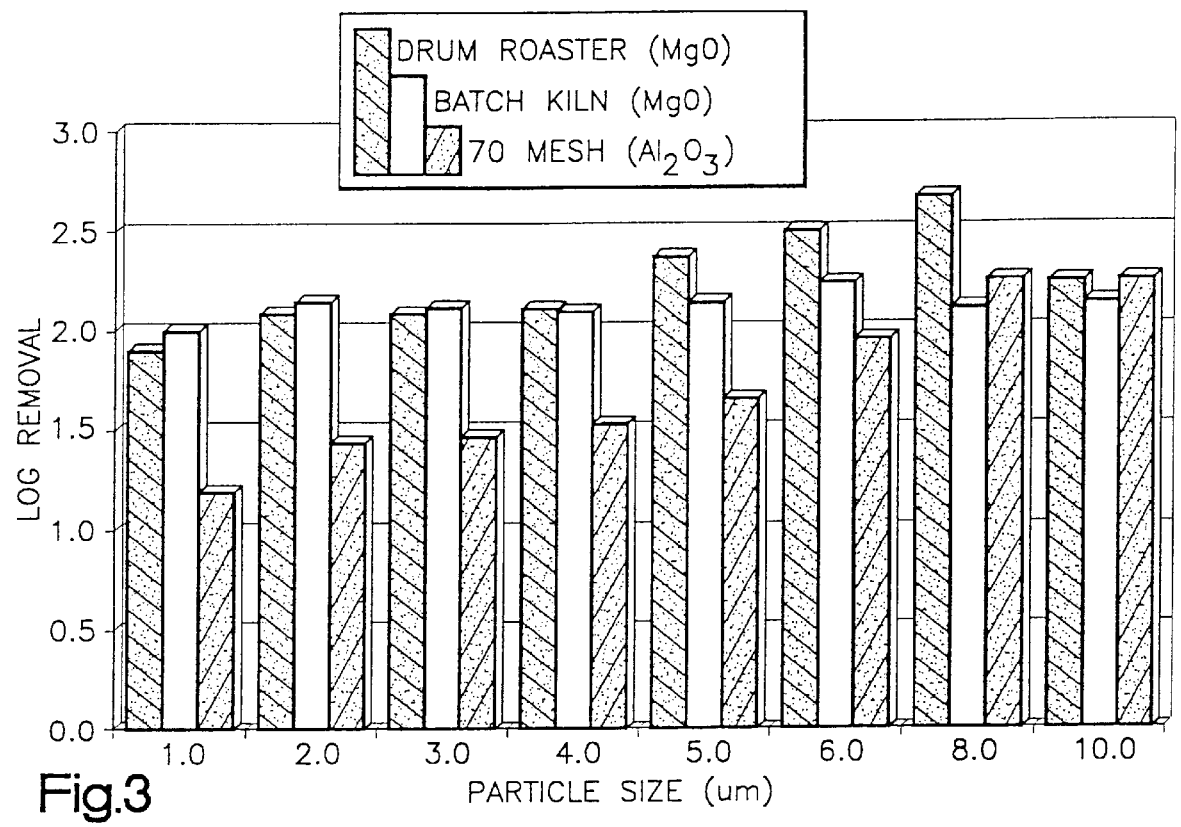
FIG. 3 is a graph showing log removal of a broad range of particle sizes using filtration material produced according to the present invention.
Figure 4:
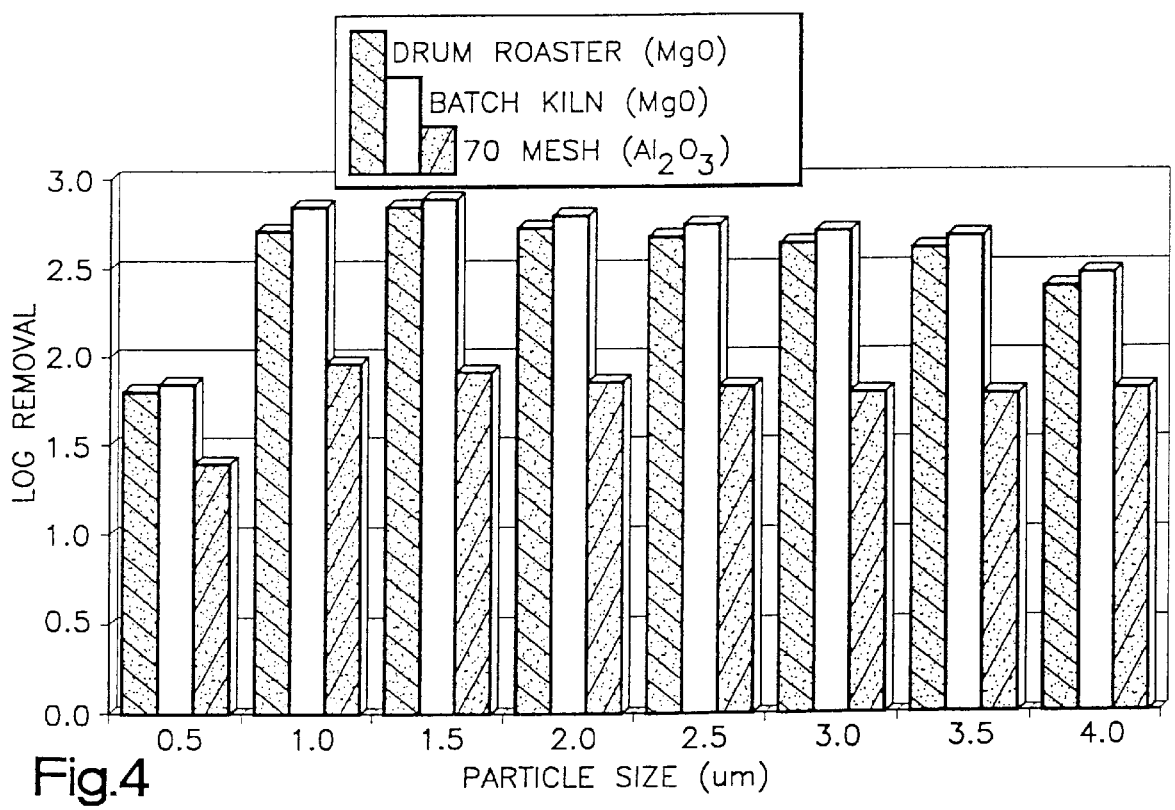
FIG. 4 is a graph similar to FIG. 3 showing log removal of smaller particles.

As can be seen by Tables 1 and 2 and FIGS. 3 and 4, the log removal of particles about 10 μm in size using the MgO—SiO$_2$ filtration material of Examples A and B was comparable to the log removal of such particles using the Al$_2$O$_3$—SiO$_2$ filtration material of Example C. However, when removing particles about 5 μm and less in size, the particle removal by the filtration material of Examples A and B was much greater than the particle removal by the filtration material of Example C. This difference in removal efficiency is attributable to the selection of MgO as the filtration material to remove fine particles from water. The MgO-containing filtration material has a stronger net positive charge in the aqueous solution having a pH of about 6–7 than does the Al$_2$O$_3$ filtration material. If the feed liquid had a pH of about 4.5 to 5.5, the Al$_2$O$_3$-containing filtration material would have been more effective in removing the fine particles.

As shown in Table III, Examples A and B provided the effluent with an overall average turbidity much less than 0.50 nephelometric turbidity units (ntu), in compliance with current EPA regulations. Although the results show that the Al$_2$O$_3$ filtration material had a turbidity slightly higher than set by the regulations, this filtration material would have had a better removal efficiency in feed liquid having a lower pH.

Figure 5:
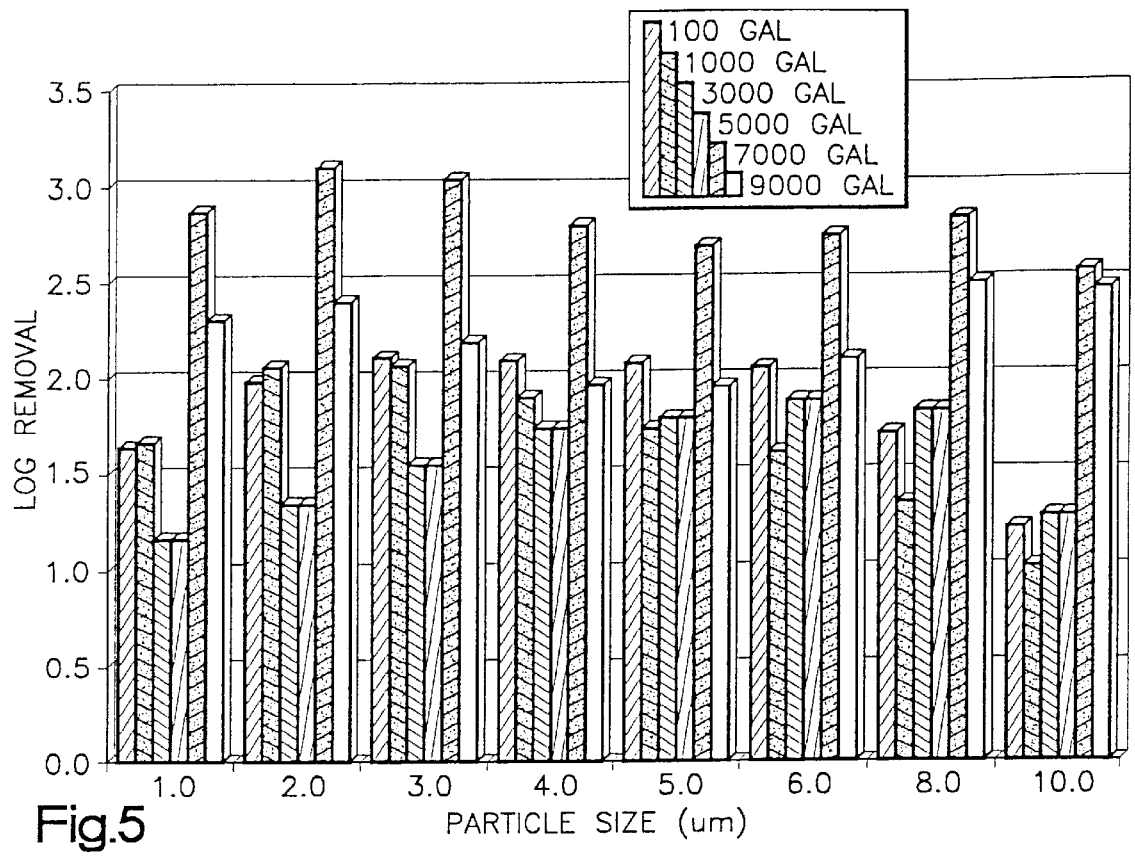
FIG. 5 is a graph showing log removal of a broad range of particle sizes using magnesium oxide-containing filtration material that has filtered varying amounts of feed liquid.
Figure 6:
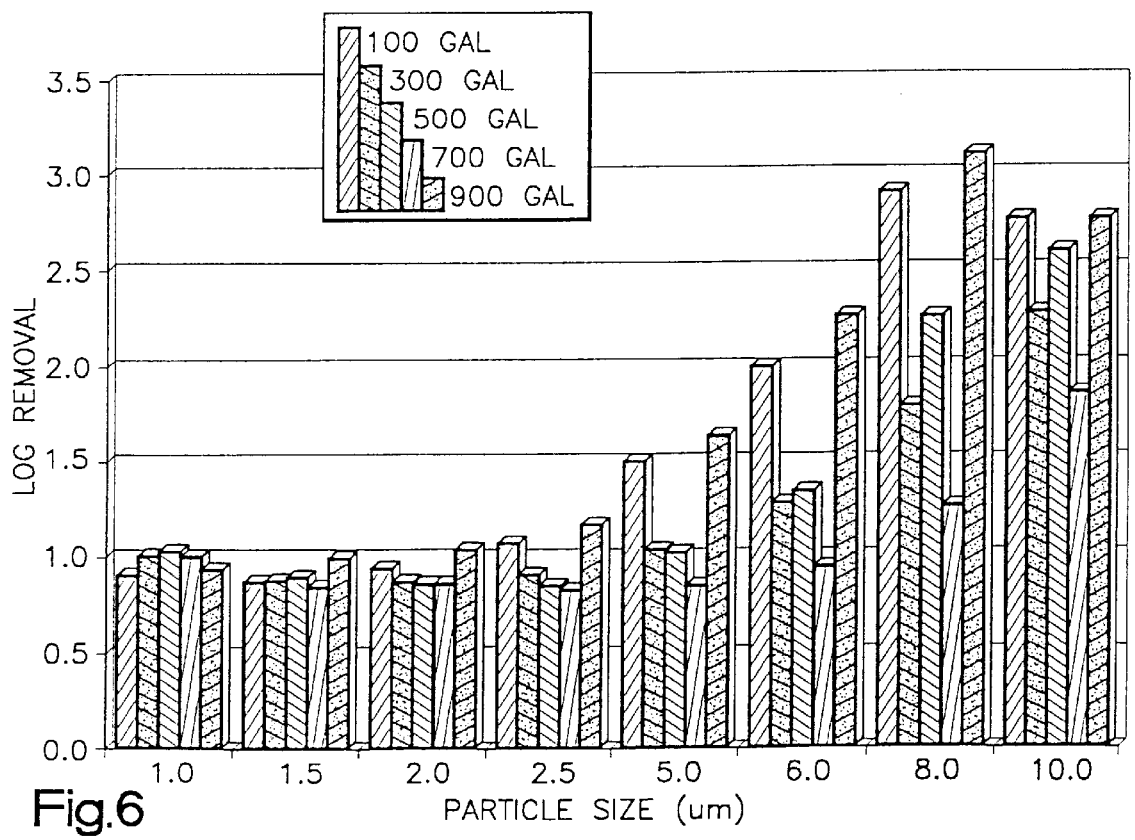
FIG. 6 is a graph similar to FIG. 5 showing log removal of a broad range of particle sizes using aluminum oxide-containing filtration material that has filtered varying amounts of feed liquid.

FIG. 5 shows log removal as a function of particle size and overall volume of feed liquid filtered by MgO-containing filtration material produced and used according to the present invention. FIG. 6 shows log removal as a function of particle size and overall volume of feed liquid filtered by Al$_2$O$_3$-containing filtration material produced and used according to the present invention. As can be seen, the physical straining mechanism typically increases with cumulative volume of feed liquid. That is, particles that have been filtered assist in filtering other particles from the solution.

The Al$_2$O$_3$-containing filtration material is clearly less effective than the MgO-containing filtration material in filtering particles of about 5 μm and less in size from water having a pH of about 6–7. For example, when removing 5 μm size particles, the MgO filtration material had a log removal above 2.00 after filtering 100 gallons of feed liquid, whereas the Al$_2$O$_3$ filtration material only had a log removal of about 1.60 after filtering 900 gallons of feed liquid.

The effectiveness of the present invention in filtrating giardia and cryptosporidium cysts is shown by the following Table IV. Organisms were injected at approximately 15 minute intervals into an aqueous solution having a pH of about 6–7. Influent samples were collected as quantitative bulk composite samples.

Effluent samples were collected using 1 μm Filterite Cottonwound filters. All samples were directly stained and enumerated using the protocol of ASTM P-229. The filtration material included Al$_2$O$_3$—SiO$_2$ surface metal oxides.

TABLE IV

Effectiveness in Removing Cysts

| Test Filter | Number of<br>Giardia<br>Challenged | Number of<br>Giardia Detected<br>in effluent | Log<br>Removal<br>Values | Number of<br>Cyptosporidum<br>Challenged | Number of<br>Cryptosporidium<br>Detected in<br>effluent | Log<br>Removal<br>Values |
|---|---|---|---|---|---|---|
| 25 gpm system<br>70 mesh with 30/50 | 5.1 × 10$^6$ | 4.1 × 10$^3$ | 3.1 | 1.7 × 10$^6$ | 3.2 × 10$^2$ | 3.7 |
| 5 gpm system w/o<br>pre-treatment<br>70 mesh with 30/50 | 2.2 × 10$^5$ | 8.5 × 10$^3$ | 1.4 | 5.0 × 10$^4$ | 3.3 × 10$^3$ | 1.2 |
| 5 gpm<br>system with<br>Ca pretreatment | 2.0 × 10$^6$ | 2.6 × 10$^4$ | 1.9 | 8.1 × 10$^5$ | 2.4 × 10$^3$ | 2.5 |

As can be seen from Table IV, removal efficiency improves even when the larger 25 gpm filtration system is used. As shown, by adding a Ca pretreatment to the feed liquid, the removal efficiency is improved. Adding divalent cations, for example, may lessen the magnitude of the negative charge on the feed liquid particles, thereby improving removal efficiency.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. A method of filtering particles from a feed liquid comprising the steps of:

selecting a metal oxide composition for a ceramic filtration material, said composition being selected to provide said filtration material with an electrical affinity of a sign and magnitude that are effective to increase an efficiency of removal of said particles at a predetermined pH of the feed liquid;

directing said feed liquid at said pH into said filtration material so as to provide said filtration material with said electrical affinity without applying an electric field across said filtration material; and attracting the particles from the feed liquid to the filtration material as a result of said electrical affinity.

2. The method of claim 1 comprising removing the particles about 5 microns and less in size from the feed liquid.

3. The method of claim 1 further comprising:

selecting a backwashing liquid pH relative to the sign and magnitude of said electrical affinity effective to provide said filtration material with an electrical repulsion for the particles attracted thereto, said backwashing liquid pH being different than the pH of said feed liquid;

directing a backwashing liquid at said selected backwashing liquid pH into the filtration material so as to provide said filtration material with said electrical repulsion; and repulsing the particles from said filtration material.

4. The method of claim 3 wherein said backwashing liquid is directed into said filtration material in an opposite direction than said feed liquid is directed into said filtration material.

5. The method of claim 3 wherein pressurized air is directed into said filtration material prior to directing said backwashing liquid into said filtration material.

6. The method of claim 1 wherein the feed liquid is directed into said filtration material under pressure.

7. The method of claim 1 wherein the feed liquid is directed into said filtration material via gravity flow.

8. The method of claim 1 wherein the feed liquid is free from chemical coagulants.

9. The method of claim 1 wherein the feed liquid is free from pH-adjusting chemicals.

10. The method of claim 1 wherein said feed liquid is water.

11. The method of claim 1 wherein said composition is selected from at least one metal oxide selected from the group consisting of oxides of silicon, aluminum and magnesium.

12. The method of claim 1 wherein said composition is selected from at least one metal oxide blend selected from the group consisting of a metal oxide blend of $SiO_2$ and $Al_2O_3$ and a metal oxide blend of $SiO_2$ and MgO.

13. The method of claim 1 wherein said composition is selected from a blend of metal oxides.

\* \* \* \* \*